United States Patent
Hashimoto (10) Patent No.: US 9,725,007 B2
(45) Date of Patent: Aug. 8, 2017

(54) ELECTRIC VEHICLE AND CONTROL METHOD THEREFOR

(71) Applicant: Toyota Jidosha Kabushiki Kaisha, Toyota-shi, Aichi-ken (JP)

(72) Inventor: Toshiya Hashimoto, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 270 days.

(21) Appl. No.: 14/705,367

(22) Filed: May 6, 2015

(65) Prior Publication Data

US 2015/0360579 A1    Dec. 17, 2015

(30) Foreign Application Priority Data

Jun. 13, 2014 (JP) .................... 2014-122313

(51) Int. Cl.
*B60L 7/18* (2006.01)
*B60L 11/18* (2006.01)

(52) U.S. Cl.
CPC ....... B60L 11/1868 (2013.01); *Y02T 10/7005* (2013.01); *Y02T 10/92* (2013.01); *Y02T 90/127* (2013.01)

(58) Field of Classification Search
CPC .............................. B60L 11/1855; B60L 11/187
See application file for complete search history.

(56) References Cited

U.S. PATENT DOCUMENTS

| 8,928,174 B2* | 1/2015 | Muto ................... B60L 11/1855 307/71 |
| 9,431,824 B2* | 8/2016 | Ishigaki ............... H02M 3/158 |
| 2013/0134786 A1 | 5/2013 | Ishigaki et al. |
| 2014/0265605 A1* | 9/2014 | Ishigaki ............... H02M 3/158 307/80 |

FOREIGN PATENT DOCUMENTS

| JP | 2004364387 A | 12/2004 |
| JP | 2008-295123 A | 12/2008 |
| JP | 2010246320 A | 10/2010 |
| JP | 2012-070514 A | 4/2012 |
| JP | 2013-077452 A | 4/2013 |

* cited by examiner

*Primary Examiner* — Jeffrey Zweizig
(74) *Attorney, Agent, or Firm* — Dinsmore & Shohl LLP (57) ABSTRACT

An electric vehicle includes a voltage converter, a temperature sensor, and a control unit. The voltage converter performs bidirectional voltage conversion between an output electric path and one or both of first and second batteries, while allowing switching of an operating mode between a serial operating mode in which the first and second batteries are connected in series relative to the output electric path, and a parallel operating mode in which the first and second batteries are connected in parallel. The temperature sensor detects a temperature of each battery. The control unit switches the operating mode of the voltage converter. When the temperature of one battery is equal to or larger than a predetermined upper threshold value A, or equal to or smaller than a predetermined lower threshold value B, the control unit switches the operating mode of the voltage converter to the parallel operating mode.

4 Claims, 8 Drawing Sheets

ELECTRIC VEHICLE AND CONTROL METHOD THEREFOR

PRIORITY INFORMATION

This application claims priority to Japanese Patent Application No. 2014-122313 filed on Jun. 13, 2014, which is incorporated herein by reference in its entirety.

TECHNICAL FIELD

The present invention relates to an electric vehicle and a control method therefor, and more particularly to a control method for an electric vehicle with a power converter mounted thereon.

BACKGROUND ART

Recently, electric vehicles including hybrid vehicles, electric cars, etc. have become more widespread. Most electric vehicles use a system to drive a motor or a motor generator with alternating current power obtained by converting direct current power of a battery using inverters. Use of a boosting converter (voltage converter) has recently become common to raise a voltage of the battery and supply the raised voltage to the motor. As a result, the rotational speed of the motor is increased and a torque operating range is widened, whereby travelling performance (speed, acceleration/deceleration performance) of the electric vehicle is often improved. Further, a recently used electric vehicle includes a plurality of batteries connected in parallel and mounted on the vehicle to increase the battery capacity, such that the vehicle can travel with the motor alone. Such a vehicle has a longer cruising distance with so-called electricity (EV) travelling. Meanwhile, a power supply system capable of changing on/off operation patterns of four switching elements to switch between serial and parallel connections of batteries, or provide various operating modes, such as boosting the voltage in the serial connection of the batteries or in the parallel connection of the batteries, etc., has also been proposed (e.g., see JP 2012-70514 A).

In the batteries connected to such a power converter as disclosed in PTL 1, the temperature of each battery is not always the same and changes variously according to the operating mode of the power converter. In some of the batteries, therefore, the temperature may become sufficiently high to cause input/output restriction (input/output current restriction). In contrast, the temperature may become sufficiently low to cause the input/output restriction (input/output current restriction). In such a case, required power for the vehicle may not be supplied due to the output restriction of the batteries because of the temperature.

Patent Document 1: JP 2012-70514 A

SUMMARY OF THE INVENTION

An object of the present invention is therefore to prevent the temperature of each battery of an electric vehicle from exceeding a predetermined operating temperature range in the electric vehicle with a voltage converter capable of switching between serial and parallel connections of batteries mounted on the electric vehicle.

An electric vehicle according to an embodiment of the present invention includes
 a first direct current (DC) power supply,
 a second DC power supply,
 a voltage converter configured to perform bidirectional voltage conversion between an output electric path and one or both of the first and second DC power supplies, while allowing switching of an operating mode between a serial operating mode in which the first and second DC power supplies are connected in series relative to the output electric path, and a parallel operating mode in which the first and second DC power supplies are connected in parallel,
 a temperature sensor configured to detect a temperature of each of the DC power supplies, and
 a control unit configured to switch the operating mode of the voltage converter. The control unit switches the operating mode of the voltage converter to the parallel operating mode when the temperature of one of the DC power supplies detected by the temperature sensor is equal to or higher than a predetermined upper threshold value or equal to or lower than a predetermined lower threshold value.

In the electric vehicle according to the embodiment of the present invention, it is also preferable that, when the temperature of one of the DC power supplies becomes equal to or higher than the predetermined upper threshold value, the control unit decreases an input/output power distribution ratio of the one of the DC power supplies and increases an input/output power distribution ratio of the other of the DC power supplies. In contrast, when the temperature of one of the DC power supplies becomes equal to or lower than the predetermined lower threshold value, the control unit increases the input/output power distribution ratio of the one of the DC power supplies and decreases the input/output power distribution ratio of the other of the DC power supplies.

An electric vehicle according to an embodiment of the present invention includes
 a first DC power supply,
 a second DC power supply,
 a voltage converter configured to perform bidirectional voltage conversion between an output electric path and one or both of the first and second DC power supplies, while allowing switching of an operating mode between a serial operating mode in which the first and second DC power supplies are connected in series relative to the output electric path, and a parallel operating mode in which the first and second DC power supplies are connected in parallel,
 a temperature sensor configured to detect a temperature of each of the DC power supplies, and
 a control unit including a central processing unit (CPU) and configured to switch the operating mode of the voltage converter. The control unit causes the CPU to execute an operating mode switching program in which the operating mode of the voltage converter is switched to the parallel operating mode when the temperature of one of the DC power supplies detected by the temperature sensor is equal to or higher than a predetermined upper threshold value, or equal to or lower than a predetermined lower threshold value.

A method for controlling an electric vehicle according to an embodiment of the present invention is provided. The electric vehicle includes
 a first DC power supply,
 a second DC power supply,
 a voltage converter configured to perform bidirectional voltage conversion between an output electric path and one or both of the first and second DC power supplies, while allowing switching of an operating mode between a serial operating mode in which the first and second DC power supplies are connected in series relative to the output electric path, and a parallel operating mode in which the first and second DC power supplies are connected in parallel, a temperature sensor configured to detect a temperature of each of the DC power supplies, and a control unit configured to switch the operating mode of the voltage converter. The method for controlling the electric vehicle includes switching the operating mode of the voltage converter to the parallel operating mode when the temperature of one of the DC power supplies detected by the temperature sensor becomes equal to or higher than a predetermined upper threshold value, or equal to or lower than a predetermined lower threshold value.

The present invention provides an advantage of preventing the temperature of each battery from exceeding a predetermined operating temperature range in an electric vehicle including a voltage converter capable of switching between series connection and parallel connection of a plurality of batteries.

DETAILED DESCRIPTION OF THE EMBODIMENT

<Structure of Electric Vehicle with Voltage Converter Mounted Thereon>

Figure 1:
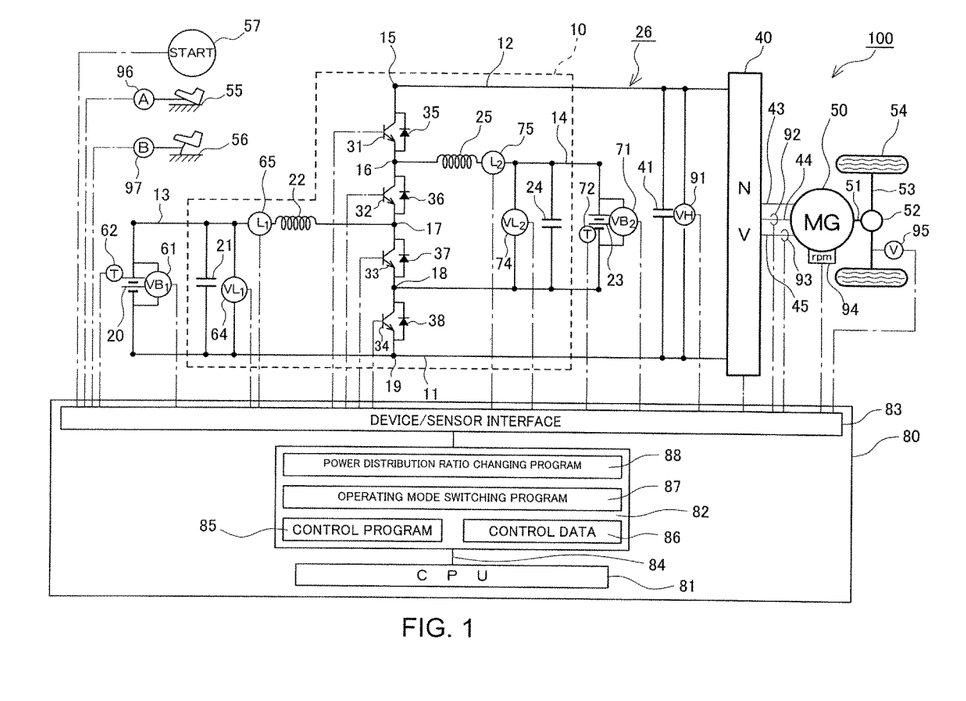
FIG. 1 is a system diagram illustrating a structure of an electric vehicle with a voltage converter mounted thereon according to an embodiment of the present invention.

An embodiment of the present invention will be described below with reference to the accompanying drawings. As illustrated in FIG. 1, an electric vehicle 100 according to an embodiment of the present invention includes a first battery 20 provided as a first direct current (DC) power supply, a second battery 23 provided as a second DC power supply, a voltage converter 10 including
a plurality of switching elements 31 to 34,
a first reactor 22,
a second reactor 25,
a first capacitor 21, and
a second capacitor 24, an output electric path 26 of the voltage converter 10, a smoothing capacitor 41 and an inverter 40 connected to the output electric path 26, a motor generator 50 connected to the inverter 40 to operate the electric vehicle 100, and a control unit 80 configured to switch the operating mode of the voltage converter 10. In FIG. 1, a signal line is indicated by a dashed line.

The output electric path 26 of the voltage converter 10 includes a grand electric path 11 connected to the negative side of the batteries 20, 23, and a high voltage electric path 12 that outputs a high voltage boosted by the voltage converter 10. The plurality of switching elements 31 to 34 are connected in series from the high voltage electric path 12 toward the grand electric path 11. Diodes 35 to 38 are connected in reverse parallel to the switching elements 31 to 34, respectively. The voltage converter 10 includes a first electric path 13 and a second electric path 14. The first electric path 13 connects a second connection point 17 between the switching elements 32 and 33 to the grand electric path 11. The second electric path 14 connects a first connection point 16 between the switching elements 31 and 32 to a third connection point 18 between the switching elements 33 and 34. The first battery 20 and the first reactor 22 are arranged in series on the first electric path 13, while the second battery 23 and the second reactor 25 are arranged in series on the second electric path 14. The first capacitor 21 is connected in parallel with the first battery 20, while the second capacitor 24 is connected in parallel with the second battery 23. The smoothing capacitor 41 is connected between the high voltage electric path 12 and the grand electric path 11.

The switching element 31 included in the voltage converter 10 is a switching element that is turned on when power accumulated (charged) in the first reactor 22 is output to the an output electric path 26, or power accumulated (charged) in the second reactor 25 is output to the output electric path 26. The switching element 32 is a switching element that is turned on when the power of the second battery 23 is accumulated (charged) in the second reactor 25, or the power accumulated (charged) in the first reactor 22 is output to the output electric path 26. The switching element 33 is a switching element that is turned on when the power of the first battery 20 is accumulated (charged) in the first reactor 22, or the power of the second battery 23 is accumulated (charged) in the second reactor 25. The switching element 34 is a switching element that is turned on when the power of the first battery 20 is accumulated (charged) in the first reactor 22, or the power accumulated (charged) in the second reactor 25 is output to the output electric path 26.

The first battery 20 includes a voltage sensor 61 that detects a voltage VB1 and a temperature sensor 62 that detects a temperature TB1. The second battery 23 includes a voltage sensor 71 that detects a voltage VB2 and a temperature sensor 72 that detects a temperature TB2. Current sensors 65, 75 that detect an electric current IL1, IL2 of the first and second electric paths 13, 14, respectively, are mounted on the first and second electric paths 13, 14. A voltage sensor 64 that detects a voltage VL1 across the first capacitor 21 is provided between the first electric path 13 and the grand electric path 11. A voltage sensor 74 that detects a voltage VL2 across the second capacitor 24 is provided on the second electric path 14. A voltage sensor 91 that detects a voltage VH across the smoothing capacitor 41 is provided between the high voltage electric path 12 and the grand electric path 11.

The inverter 40 includes a plurality of switching elements, which are not illustrated, and turns the switching elements on/off to convert DC power output from the output electric path 26 (which is constituted by the grand electric path 11 and the high voltage electric path 12) of the voltage converter 10 into three-phase alternating current (AC) power to be output from output lines 43, 44, 45, respectively, for each phase. The output lines 43, 44, 45 of U, V, and W phases, respectively, are connected to a motor generator 50. Current sensors 92, 93 that detect an electric current of each phase are attached to the V-phase output line 44 and the W-phase output line 45, respectively. A resolver 94 that detects the rotational speed and a rotation angle of a rotor is attached to the motor generator 50. An output shaft 51 of the motor generator 50 is connected to a gear device 52 to which an axle 53 is attached. Wheels 54 are attached to the axle 53 to which a speed sensor 95 that detects a vehicle speed from the rotational speed of the axle 53 is attached. In the interior of the electric vehicle 100, an acceleration pedal 55, a brake pedal 56, and a start switch 57 are provided. A depression amount sensor 96 of the acceleration pedal and a depression amount sensor 97 of the brake pedal are attached to the acceleration pedal 55 and the brake pedal 56, respectively.

The control unit 80 includes a CPU 81 that performs calculation and information processing, a storage unit 82, and a device/sensor interface 83 to which individual units and sensors are connected. The storage unit 82 stores a control program 85, control data 86, an operating mode switching program 87 which will be described later, and a power-distribution-ratio changing program 88. The control unit 80 is configured as a computer in which the CPU 81, the storage unit 82, and the device/sensor interface 83 are connected via a data bus 84. The switching elements 31 to 34 of the voltage converter 10 and the switching elements of the inverter 40 are connected to the control unit 80 via the device/sensor interface 83 and turned on/off in accordance with an instruction from the CPU 81. The voltage sensors 61, 64, 71, 74, 91, the current sensors 65, 75, 92, 93, the temperature sensors 62, 72, the resolver 94, the speed sensor 95, the depression amount sensor 96 of the acceleration pedal, the depression amount sensor 97 of the brake pedal, and the start switch 57 are connected to the control unit 80 via the device/sensor interface 83. Each sensor detects data that is then input to the control unit 80.

<Basic Operation of Voltage Converter 10>

The voltage converter 10 switches on/off operation patterns of the four switching elements 31 to 34 to boost the voltages of the first and second batteries 20, 23 and outputs the boosted voltages to the output electric path 26. Alternatively, the voltage converter 10 drops the voltage of the output electric path 26 to charge the first and second batteries 20, 23. The voltage converter 10 thus performs bidirectional voltage conversion between the output electric path 26 and one or both of the first and second batteries 20, 23, while allowing switching of series connection and parallel connection of the first and second batteries 20, 23 relative to the output electric path 26. In the following, a basic operation of the voltage converter 10 will be briefly described with reference to FIGS. 2 to 5. In the description below, the switching element 31 is indicated by S1(31) using a symbol S1 and a reference numeral 31, the switching element 32 is indicated by S2(32) using a symbol S2 and a reference numeral 32, the switching element 33 is indicated by S3(33) using a symbol S3 and a reference numeral 33, and the switching element 34 is indicated by S4(34) using a symbol S4 and a reference numeral 34. The diodes 35 to 38 connected in reverse parallel to the switching elements 31 to 34, respectively, are indicated by D1(35) to D4(38) using symbols D1 to D4 and reference numerals 35 to 38. Similarly, the first and second batteries 20, 23 are indicated by B1(20), B2(23), respectively, using symbols B1, B2 and reference numerals 20, 23. The first and second capacitors 21, 24 are indicated by C1(21), C2(24), respectively, using symbols C1, C2 and reference numerals 21, 24. The first and second reactors 22, 25 are indicated by L1(22), L2(25), respectively, using symbols L1, L2 and reference numerals 22, 25. The switching elements 31 to 34 are semiconductor elements, e.g., insulated-gate bipolar transistors (IGBTs), in which the electric current flows, when the switching elements are turned on, only in a direction indicated by arrows illustrated in FIG. 1 and not in a direction opposite to the direction indicated by the arrows. In FIGS. 2 to 5, the switching elements 31 to 34 are illustrated in a simplified form as simple on/off switches to indicate the on/off state of the switching elements 31 to 34.

<Voltage Boosting/Dropping Operation (Serial Operating Mode) When B1(20), B2(23) are Connected in Series>

Figure 2:
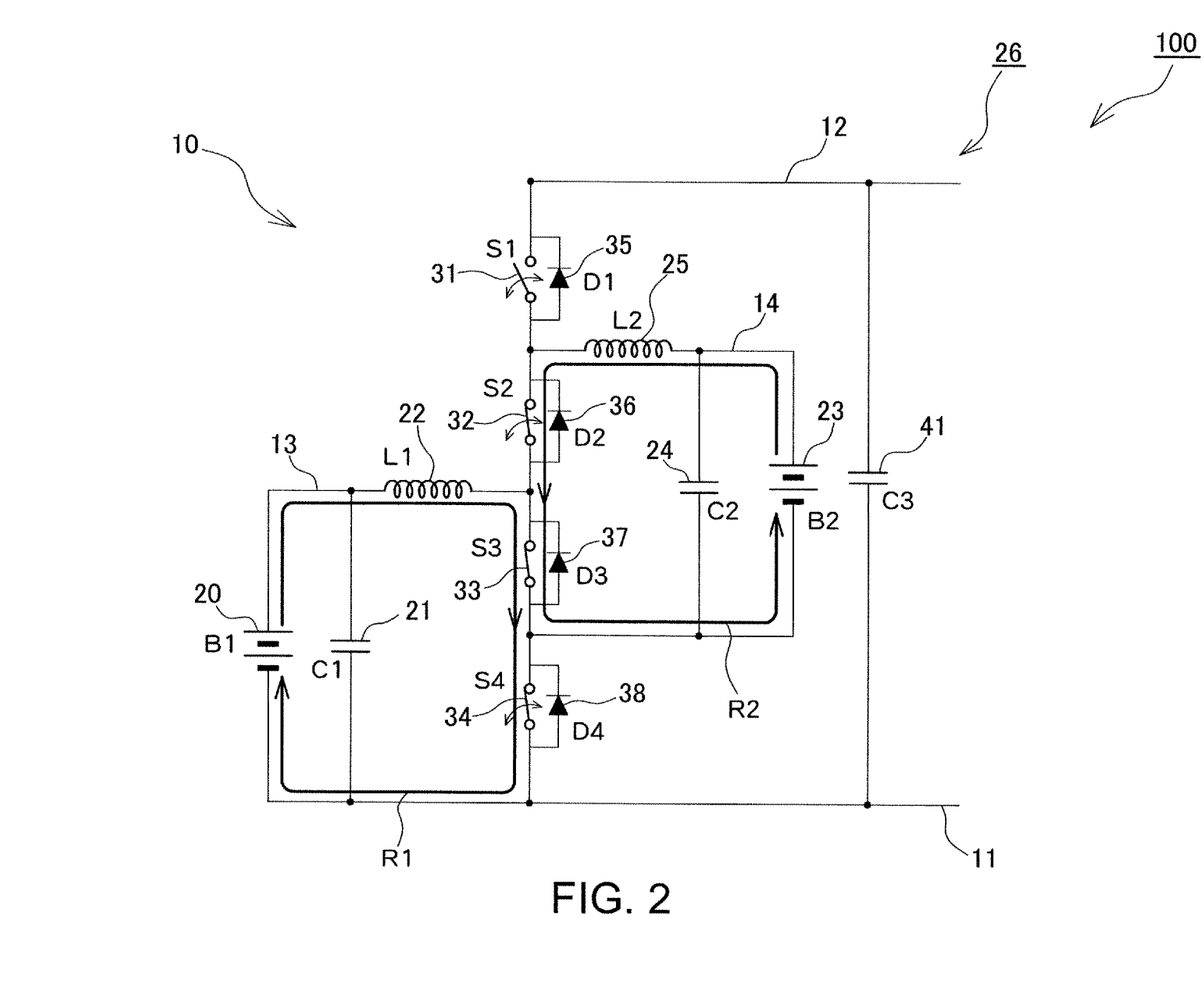
FIG. 2 is an explanatory view illustrating the flow of an electric current while first and second batteries are connected in series during reactor charge in a basic operation of a voltage converter mounted on the electric vehicle according to the embodiment of the present invention.
Figure 3:
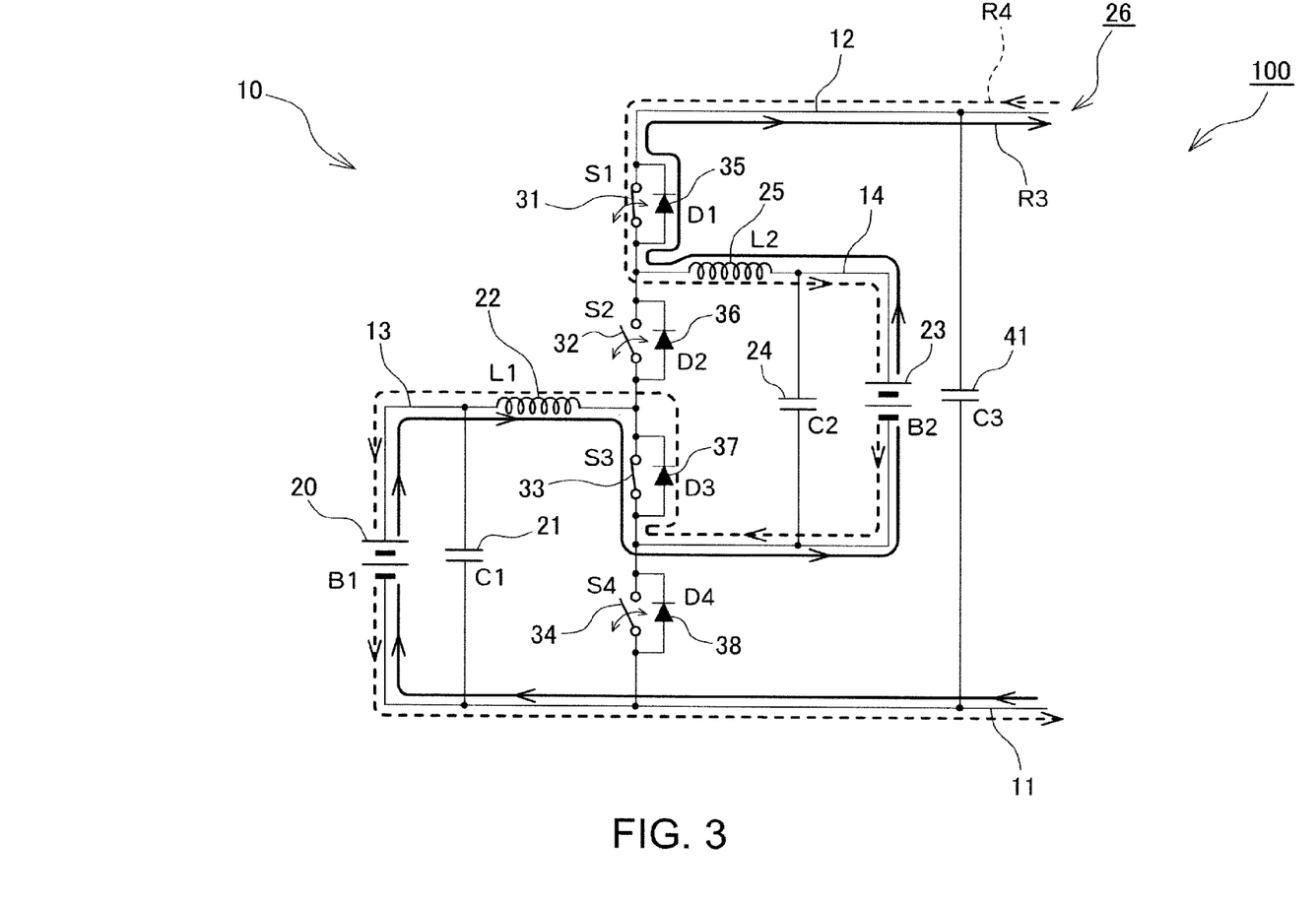
FIG. 3 is an explanatory view illustrating the flow of an electric current while the first and second batteries are connected in series during power output in the basic operation of the voltage converter mounted on the electric vehicle according to the embodiment of the present invention.

Referring to FIGS. 2 and 3, a voltage boosting/dropping operation when B1(20), B2(23) are connected in series will be described. As illustrated in FIG. 2, the control unit 80 fixes S3(33) in an on-state, while turning on/off S1(31), S2(32), and S4(34). As illustrated in FIG. 2, at the moment when S1(31) is turned off and S2(32), S3(33), and S4(34) are turned on, a circuit R1 in which the electric current flows through [B1(20)→L1(22)→S3(33)→S4(34)→B1(20)], and a circuit R2 in which the electric current flows through [B2(23)→L2(25)→S2(32)→S3(33)→B2(23)] are established. As a result, the power output from B1(20) is charged in L1(22), while the power output from B2(23) is charged in L2(25).

Next, with reference to FIG. 3, at the moment when S1(31) is turned on and S2(32) and S4(34) are turned off, a circuit R3 in which the electric current flows through [B1(20)→L1(22)→S3(33)→B2(23)→L2(25)→D1(35)→ the high voltage electric path 12→the grand electric path 11→B1(20)] is established. The power having been charged in L1(22), L2(25) is output to the high voltage electric path 12 through the circuit R3 (indicated by a solid line). When regenerative power is generated by the motor generator 50 while S1(31) is turned on, the generated regenerative power flows through a circuit R4 (indicated by a broken line) in which the electric current flows through [the high voltage electric path 12→S1(31)→L2(25)→B2(23)→D3(37)→L1(22)→B1(20)→the grand electric path 11→the high voltage electric path 12]. The regenerative power is then charged in the B2(23), B1(20).

As described above, the control unit 80 turns on/off S1(31), S2(32), S4(34), with S3(33) being fixed in the on-state, to boost B1(20), B2(23), and serially connects them to the output electric path 26 (the high voltage electric path 12, the grand electric path 11) to charge B1(20), B2(23) with the regenerative power on the output electric path 26.

<Voltage Boosting/Dropping Operation (Parallel Operating Mode) when B1(20), B2(23) are Connected in Parallel>

Figure 4:
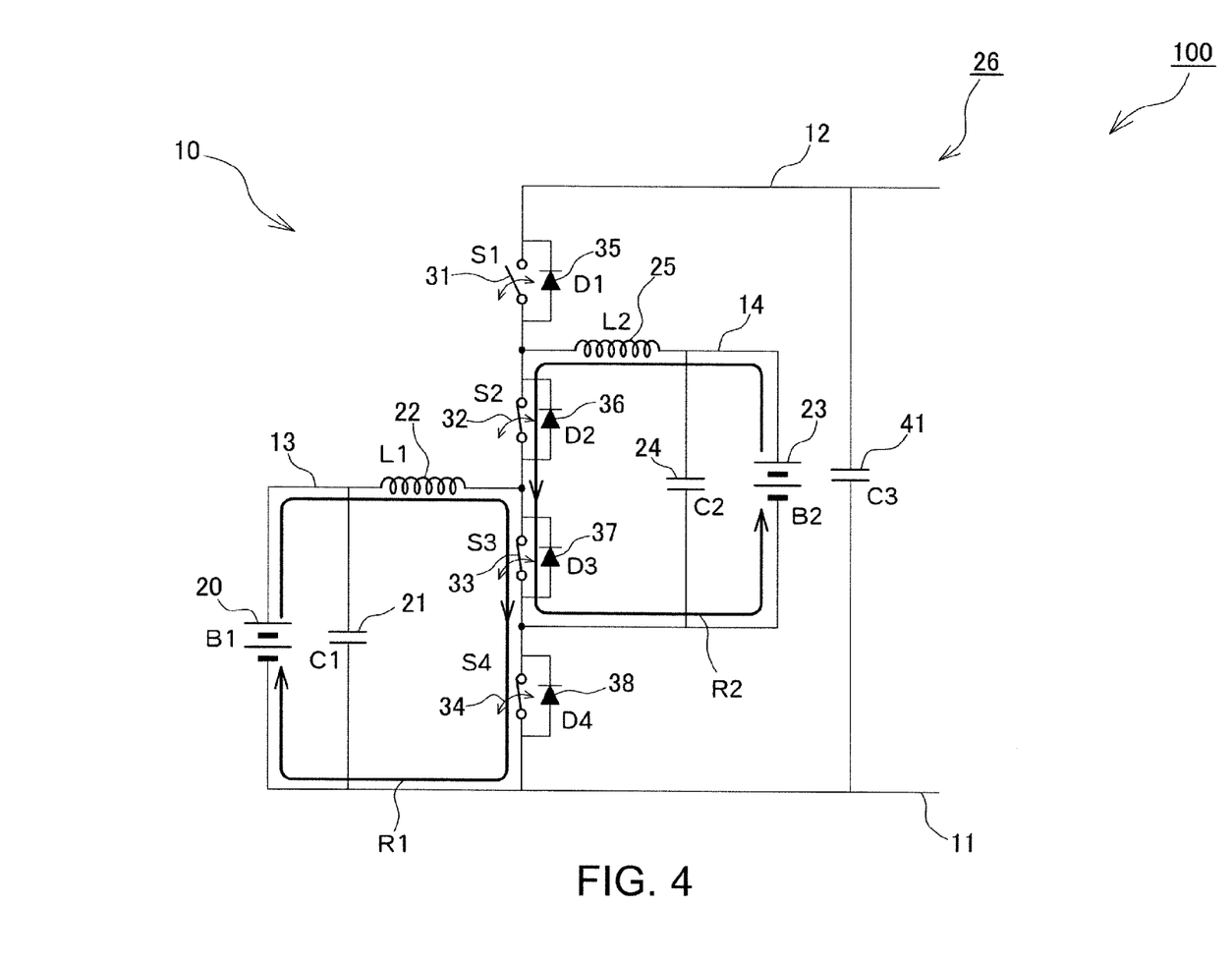
FIG. 4 is an explanatory view illustrating the flow of an electric current while the first and second batteries are connected in parallel during the reactor charge in the basic operation of the voltage converter mounted on the electric vehicle according to the embodiment of the present invention.
Figure 5:
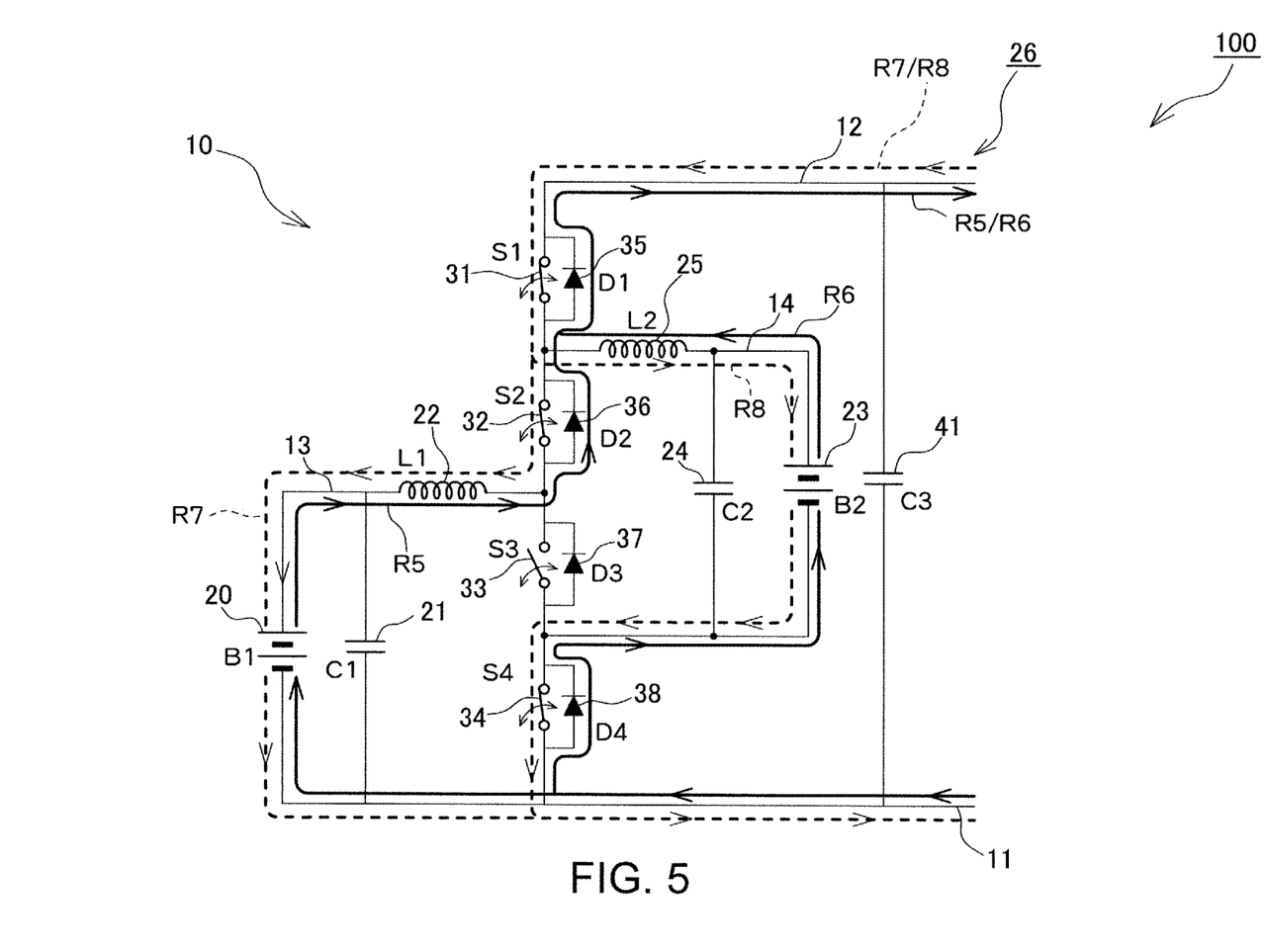
FIG. 5 is an explanatory view illustrating the flow of an electric current while the first and second batteries are connected in parallel during the power output in the basic operation of the voltage converter mounted on the electric vehicle according to the embodiment of the present invention.

With reference to FIGS. 4 and 5, the voltage boosting/dropping operation when B1(20) and B2(23) are connected in parallel will be described. As illustrated in FIGS. 4 and 5, the control unit 80 turns on/off S1(31) to S4(34). As illustrated in FIG. 4, at the moment when S1(31) is turned off and S2(32) to S4(34) are turned on, the power output from B1(20) is charged in L1(22), while the power output from B2(23) is charged in L2(25), as described in connection with FIG. 2. Next, as illustrated in FIG. 5, at the moment when S3(33) is turned off and S1(31), S2(32), and S4(34) are turned on, a circuit R5 (indicated by a solid line) and a circuit R6 (indicated by a solid line) are established. In the circuit R5, the electric current flows through [B1(20)→L1(22)→D2(36)→D1(35)→the high voltage electric path 12→the grand electric path 11→B1(20)]. In the circuit R6, the electric current flows through [B2(23)→L2(25)→D1(35)→the high voltage electric path 12→the grand electric path 11→B2(23)]. The power charged in L1(22) is output through the circuit R5 and the power charged in L2(25) is output through the circuit R6 to the high voltage electric path 12. At this moment, if the regenerative power is generated by the motor generator 50, the regenerated power flows, as illustrated in FIG. 5, through a circuit R7 (indicated by a broken line) and a circuit R8 (indicated by a broken line). In the circuit R7, the electric current flows through [the electric path 12→S1(31)→S2(32)→L1(22)→B1(20)→the grand electric path 11→the high voltage electric path 12]. In the circuit R8, the electric current flows through [the high voltage electric path 12→S1(31)→L2(25)→B2(23)→S4(34)→the grand electric path 11→the high voltage electric path 12]. The regenerative power is then charged in B2(23).

As described above, the control unit 80 turns on/off S1(31) to S4(34) to boost B1(20), B2(23) and connects them in parallel to the output electric path 26 (the high voltage electric path 12, the grand electric path 11) to charge B1(20) and B2(23) with the regenerative power on the output electric path 26.

<Serial Operating Mode and Parallel Operating Mode>

The basic operation of the voltage converter 10 has been described above. In the serial operating mode, B1(20), B2(23) are serially connected with each other and the same amount of electric current flows through B1(20), B2(23). If, therefore, the temperature of one battery, for example, becomes equal to or higher than a predetermined operating temperature range, the output power or electric current of the battery whose temperature has risen is restricted, and the output power of the voltage converter 10 is also restricted. In the serial operating mode, however, it is not possible to control the electric current flowing through B1(20), B2(23) separately and is necessary to wait until the temperature of the battery whose temperature has risen falls within (or decreases to) the predetermined operating temperature range.

Meanwhile, when the electric vehicle 100, for example, travels at low speed using the one battery alone under a low temperature environment, the battery in use can output sufficient power as the temperature has been raised by the flow of the electric current, while the temperature of the battery that is not in use remains low. In this state, if the power required for the electric vehicle 100 is increased and the voltage converter 10 is operated in the serial operating mode, in which two batteries are connected in series, to supply power to the electric vehicle 100, the output power or the electric current of the battery on the lower temperature side should be restricted, and the supply power from the voltage converter 10 should also be restricted. Similarly to the case described above, since the electric current flowing through B1(20), B2(23) cannot be controlled separately in the serial operating mode, it is necessary to restrict the output power of the voltage converter 10 and wait until the low temperature of the battery changes (or rises) to enter the predetermined operating temperature range.

Therefore, when the temperature of one of B1(20), B2(23) of the electric vehicle 100 of the present embodiment becomes equal to or higher than a predetermined upper threshold value A, or equal to or lower than a predetermined lower threshold value B, the operating mode of the voltage converter 10 is switched to the parallel operating mode described above. Simultaneously, the amount of the electric current flowing through the battery whose temperature has risen is decreased in order to lower the temperature of the battery, while the amount of the electric current flowing through the battery whose temperature has been lowered is increased in order to raise the temperature of the battery. As a result, the temperature of the battery does not exceed the predetermined operating temperature range. In the following, the operation of the electric vehicle 100 of the present embodiment will be described with reference to FIGS. 6 to 8.

<Description of Operation of Electric Vehicle 100>

The CPU 81 of the control unit 80 executes the operating mode switching program 87 illustrated in FIG. 1. As illustrated in step S101 of FIG. 6, the control unit 80 detects the temperatures TB1, TB2 of B1(20), B2(23), respectively, using the temperature sensors 62, 72 illustrated in FIG. 1. As illustrated in step S102 of FIG. 6, the control unit 80 compares the detected temperatures TB1, TB2 with the upper threshold value A (e.g., about 40° C.), which is slightly lower than the upper limit of the predetermined temperature range, and the lower threshold value B (e.g., 0° C.), which is slightly higher than the lower limit of the predetermined temperature range, and determines whether one of TB1, TB2 of B1(20), B2(23), respectively, is equal to or higher than the upper threshold value A or equal to or lower than the lower threshold value B. If one of TB1, TB2 is equal to or higher than the upper threshold value A or equal to or lower than the lower threshold value B, the control unit 80 advances the process to step S103 to switch the operating mode of the voltage converter 10 to the parallel operating mode, as described above. If both TB1, TB2 are higher than the lower threshold value B and lower than the upper threshold value A, the control unit 80 returns the process to step S101 of FIG. 6 to continue monitoring of the temperatures TB1, TB2 of B1(20), B2(23) (the end of the operating mode switching program 87).

Next, the control unit 80 executes the power-distribution-ratio changing program 88 illustrated in FIG. 1 using the CPU 81. As illustrated in step S104 of FIG. 6, the control unit 80 uses the resolver 94, the current sensors 92, 93, the speed sensor 95, the depression amount sensor 96 of the acceleration pedal, and the depression amount sensor 97 of the brake pedal to detect the rotational speed of the motor generator 50, a supplied electric current, a vehicle speed, and a depression amount of each pedal. As illustrated in step S105 of FIG. 6, the control unit 80 calculates a required power of the electric vehicle 100 based on the data detected in step S104 of FIG. 6, and sets a target VH that is a target value of the optimal high voltage VH after boosting according to a control map stored in the control data 86 illustrated in FIG. 1.

Next, the case where the temperature of either B1(20) or B2(23) is equal to or higher than the predetermined upper threshold value A will be described. As illustrated in step S107 of FIG. 6, when the temperature of either B1(20) or B2(23) is equal to or higher than the predetermined upper threshold value A, the control unit 80 advances the process to step S108 illustrated in FIG. 6 and sets the battery having the temperature equal to or higher than the predetermined upper threshold value A (hereinafter referred to as a high temperature battery) as a current source battery. The other battery (hereinafter referred to as a normal battery) is set as a voltage source battery.

In the parallel operating mode, when the control (voltage control) is performed to simultaneously set the output voltage of both B1(20) and B2(23) to be the target VH, a required power of the high voltage VH may not stably be supplied to a load. Therefore, one of B1(20) and B2(23) is operated as the voltage source battery to control the output voltage (a boosted voltage as the high voltage VH), while the other of B1(20) and B2(23) is operated as the current source battery to control the electric current of the power supply. The present embodiment describes controlling the battery whose temperature is equal to or higher than the predetermined upper threshold value A (high temperature battery) as the current source battery, and controlling the other battery as the voltage source battery.

Figure 6:
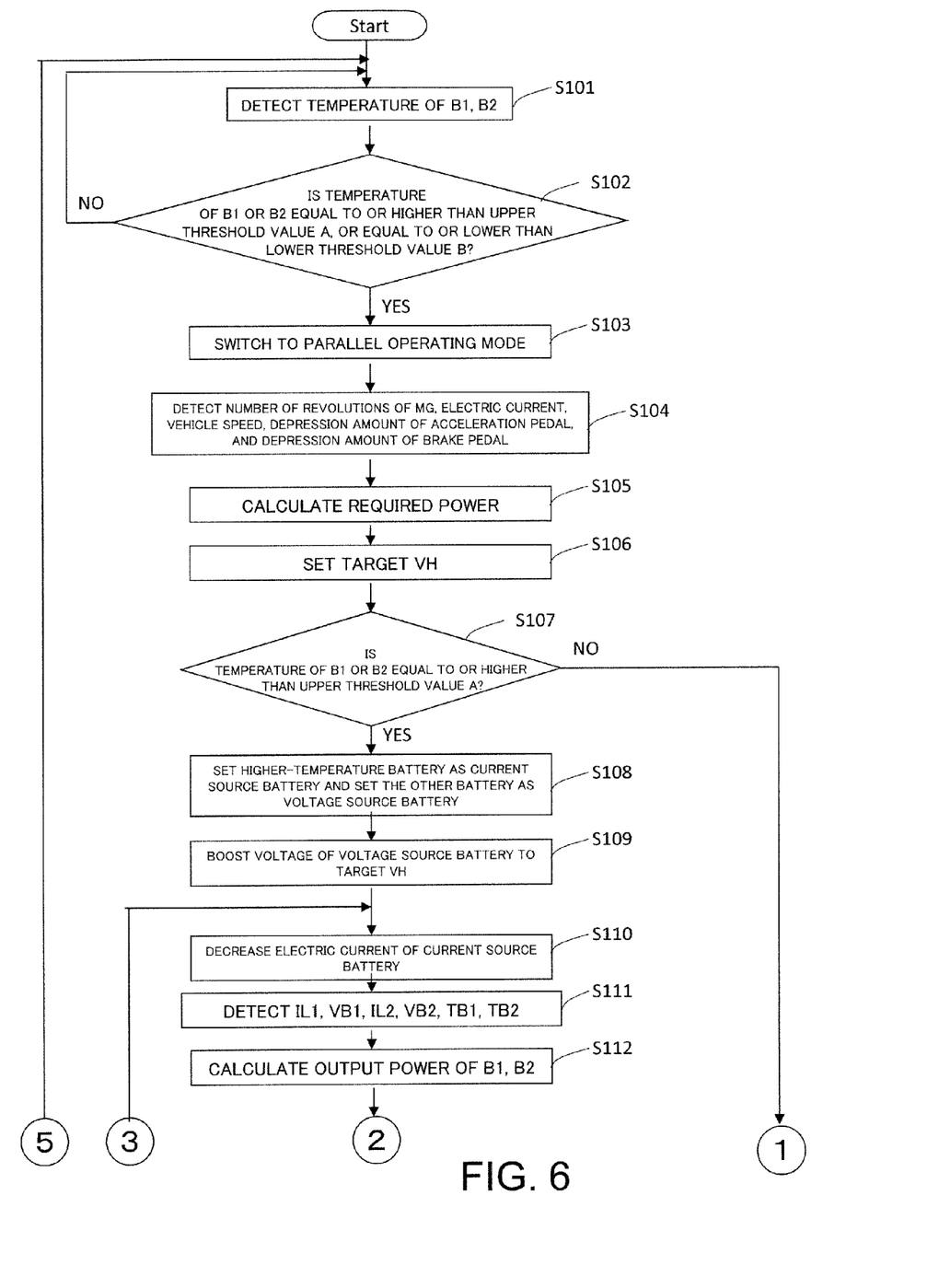
FIG. 6 is a flowchart (1) illustrating an operation of the electric vehicle with the voltage converter mounted thereon according to the embodiment of the present invention.

As illustrated in step S109 of FIG. 6, the control unit 80 turns on/off the switching elements S1(31) to S4(34) to boost the voltage of the voltage source battery (normal battery) to the target VH. An output power PH of the high temperature battery (current source battery), an output power PS of the normal battery (voltage source battery), a required power PR of the electric vehicle 100, and a current command value Ih* of the high temperature battery (current source battery) are related to one another in the following equation:

$$PS \text{ (output power of normal battery)} = PR \text{ (required power)} - PH \text{ (output power of high temperature battery)} = PR \text{ (required power)} - Vh \text{ (voltage of high temperature battery)} \times Ih^* \text{ (current command value of high temperature battery)}$$

Specifically, the output power PH of the high temperature battery is controlled by the current command value Ih*, and the output power PS of the normal battery is provided as a difference between the required power PR of the electric vehicle 100 and the output power PH of the high temperature battery. Since the high temperature battery and the normal battery are connected in parallel, the output voltage of the normal battery after boosting becomes the target VH equivalent to the output voltage of the normal battery.

As illustrated in step S110 of FIG. 6, the control unit 80 outputs a command to decrease the current command value Ih* of the high temperature battery (current source battery). In accordance with the command, the output current of the high temperature battery (current source battery) is decreased, and as a result of this, the output power of the high temperature battery (current source battery) is decreased. Meanwhile, the output power of the normal battery (voltage source battery) is increased by an amount equivalent to the decreased amount of the output power of the high temperature battery (current source battery). As illustrated in step S111 of FIG. 6, the control unit 80 detects the output current IL1, IL2, the voltage VB1, VB2, and the temperature TB1, TB2 of B1(20), B2(23), respectively, using the current sensors 65, 75, the voltage sensors 61, 71, and the temperature sensors 62, 72 illustrated in FIG. 1, in order to determine the output power of B1(20), B2(23) as illustrated in step S112 of FIG. 6. The control unit 80 then determines whether the output power of the normal battery (voltage source battery) is increasing in the vicinity of the maximum power capable of being input to or output from the battery, as illustrated in step S113 of FIG. 7. For example, when B1(20) is the normal battery (voltage source battery), and the output power of B1(20) calculated in step S112 of FIG. 6 is not in the vicinity of, for example, about 90% of the maximum power capable of being input to or /output of from the battery at the temperature TB1 of B1(20) detected in step S111 of FIG. 6, the control unit 80 determines that there is a margin to decreases the output power of the high temperature battery (current source battery) and increase the output power of the normal battery (voltage source battery). Accordingly, the control unit 80 returns the process to step S110 of FIG. 6 to further decrease the electric current of the high temperature battery (current source battery).

Figure 7:
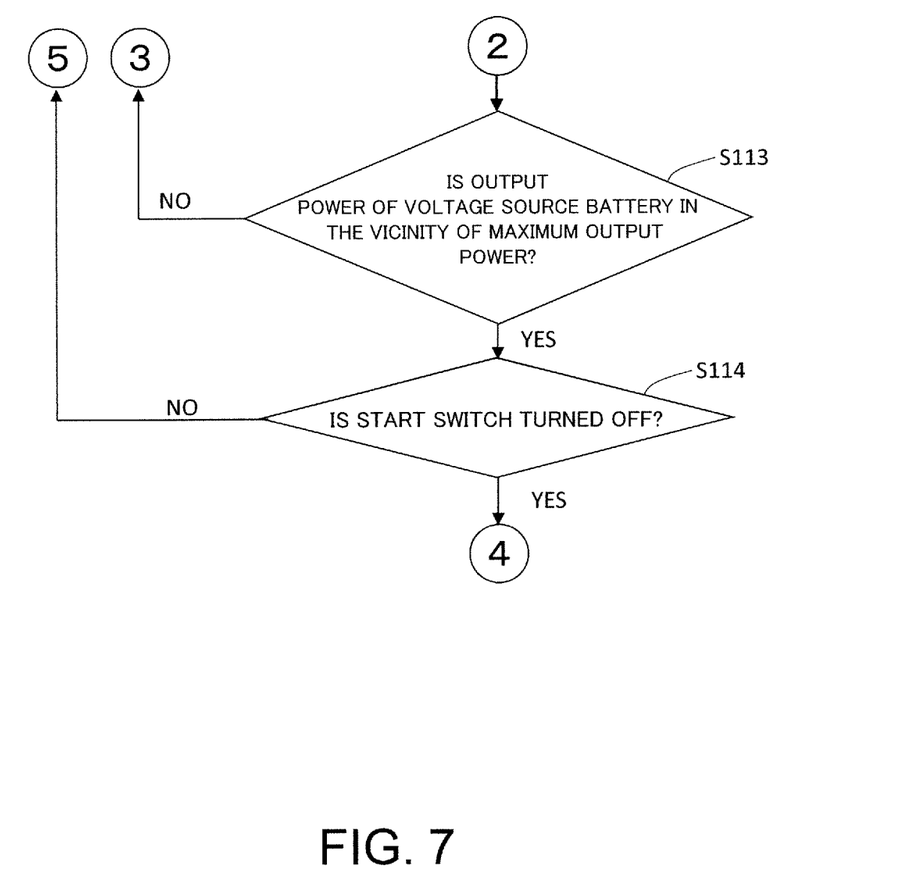
FIG.7 is a flowchart (2) illustrating an operation of the electric vehicle with the voltage converter mounted thereon according to the embodiment of the present invention.

The control unit 80 repeats steps S110 of FIG. 6 to S113 of FIG. 7 to decrease the electric current of the high temperature battery (current source battery) as much as possible until the output power of the normal battery (voltage source battery) falls in the vicinity of the maximum power capable of being input to or /output of from the battery. The control unit 80 thus controls the input/output power distribution ratio (a ratio of the input/output power of the high temperature battery to the total input/output power of the voltage converter 10) of the high temperature battery (current source battery) to decrease, while increasing the input/output power distribution ratio (a ratio of the input/output power of the normal battery to the total input/output power of the voltage converter 10) of the normal battery (voltage source battery). As a result, the temperature of the high temperature battery is lowered to perform the operation within the predetermined operating temperature range.

As illustrated in step S114 of FIG. 7, the control unit 80 determines whether the start switch 57 illustrated in FIG. 1 is turned off. If the start switch 57 is turned off, the control unit 80 advances the process from a terminal 4 (indicated by a numeral enclosed in a circle in FIG. 8) to the "end" of FIG. 8 to complete the power distribution ratio changing program 88. If the start switch 57 is turned on, the process jumps from a terminal 5 (indicated by a numeral enclosed in a circle in FIG. 8) to another terminal 5 (indicated by a numeral enclosed in a circuit in FIG. 6) to return to step S101 of FIG. 6. The temperatures TB1 and TB2 of B1(20) and B2(23), respectively, are then monitored.

Figure 8:
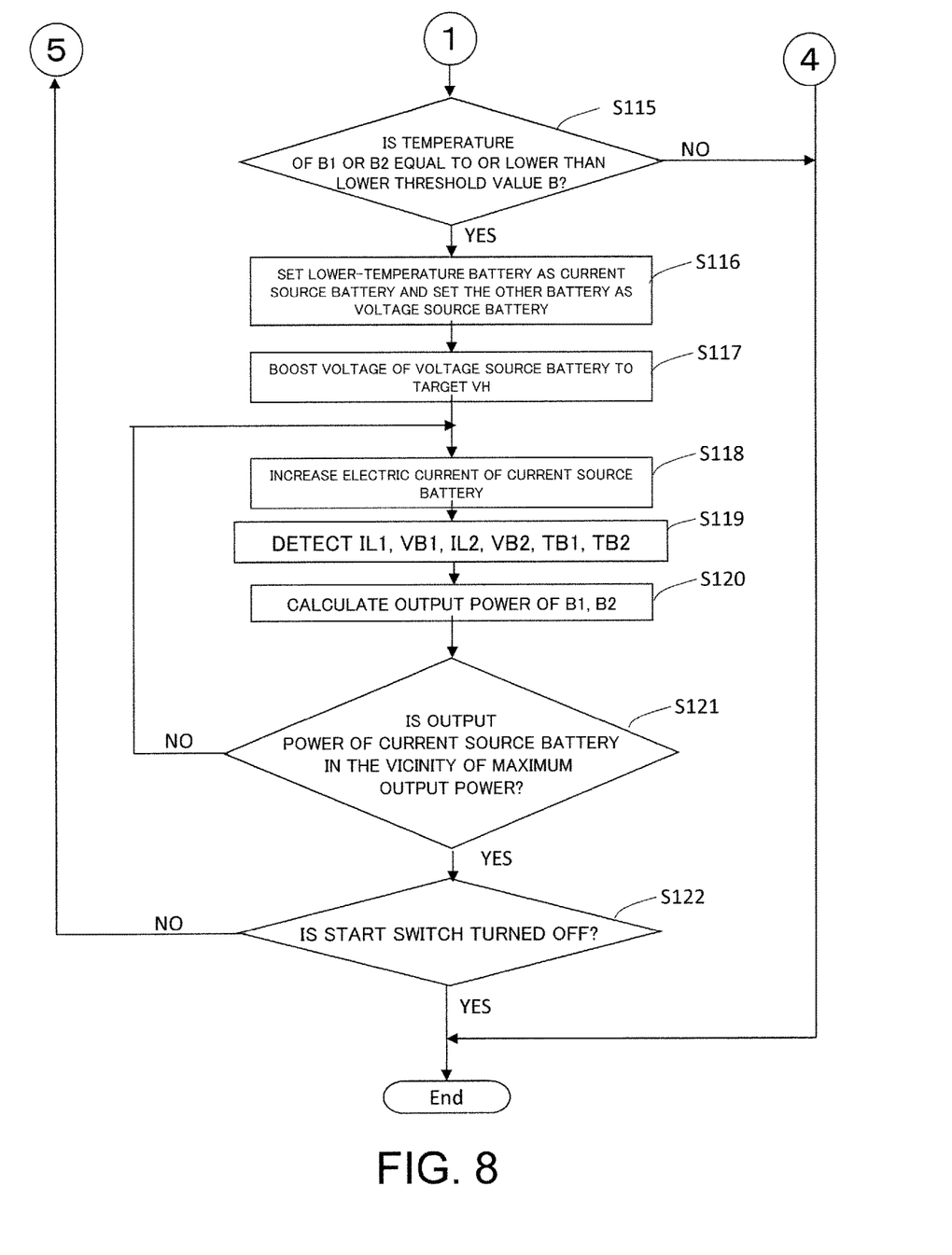
FIG. 8 is a flowchart (3) illustrating an operation of the electric vehicle with the voltage converter mounted thereon according to the embodiment of the present invention.

When the control unit 80 determines that the temperature of one of B1(20) and B2(23) is not equal to or higher than the predetermined upper threshold value A in step S107 of FIG. 6, the process jumps to step S115 of FIG. 8 to determine whether the temperature of one of B1(20) and B2(23) is equal to or lower than the predetermined lower threshold value B. If the temperature of one of B1(20) and B2(23) is equal to or lower than the predetermined lower threshold value B, the control unit 80 sets the battery having a lower temperature (hereinafter referred to as a low temperature battery) as the current source battery, and the other battery (normal battery) as the voltage source battery, as illustrated in step S116 of FIG. 8. Similar to the procedure described in connection with steps S109 of FIGS. 6 to S113 of FIG. 7, the control unit 80 boosts the voltage of the normal battery (voltage source battery) to the target VH as illustrated in step S117 of FIG. 8. As illustrated in steps S118 to S121 of FIG. 8, the control unit 80 then detects the output current IL1, IL2, the voltage VB1, VB2, and the temperature TB1, TB2 of B1(20), B2(23), respectively, to calculate the output power of B1(20), B2(23) and increase the electric current of the low temperature battery (current source battery) until the output power of the low temperature battery (current source battery) falls in the vicinity of the maximum power capable of being input to or /output of from the battery.

The control unit 80 thus controls the input/output power distribution ratio (the ratio of the input/output power of the high temperature battery to the total input/output power of the voltage converter 10) of the low temperature battery (current source battery) to increase, while decreasing the input/output power distribution ratio (the ratio of the input/output power of the normal battery to the total input/output power of the voltage converter 10) of the normal battery (voltage source battery). As a result, the temperature of the low temperature battery is raised to perform the operation within the predetermined operating temperature range.

As illustrated in step S122 of FIG. 8, the control unit 80 determines whether the start switch 57 illustrated in FIG. 1 is turned off. If the start switch 57 is turned off, the control unit 80 ends the power distribution ratio changing program 88. If the start switch 57 is turned on, the process jumps to a terminal 5 in FIG. 8 (indicated by a numeral enclosed in a circle in FIG. 8) to another terminal 5 of FIG. 6 (indicated by a numeral enclosed in a circle in FIG. 6) and returns to step S101 of FIG. 6. The temperatures TB1, TB2 of B1(20), B2(23), respectively, are then monitored.

As described above, the control unit 80 of the electric vehicle 100 according to the present embodiment with the voltage converter 10 capable of switching serial/parallel connections of the plurality of batteries mounted on the electric vehicle 100 is able to prevent the temperature of each battery from exceeding the predetermined operating temperature range.

The embodiment of the present invention having been described above is not intended to limit the scope of the invention. Instead, the present invention includes all modifications and changes as would fall within the technical scope and spirit of the invention covered by the accompanying claims and their equivalents. For example, the voltage converter 10 described in the embodiment above can switch serial and parallel connections between the first and second batteries and the output electric path 46 by turning the four switching elements on/off, but the voltage converter may use three switching elements or may include five or more switching elements so long as the serial connection and the parallel connection can be switched between the first and second battery and the output electric path 26.

Alternatively, when a certain operation state continues to further increase the difference in temperature between the batteries 20, 23 to widen the temperature difference, it is more likely that the input/output power of the batteries 20, 23 is restricted. Further, when the temperature difference is increased, it may be indicated that the load of one battery is higher than the load of the other battery. Therefore, the operating mode of the voltage converter 10 may be switched to the parallel operating mode when the difference in temperature between TB1 and TB2 of B1(20) and B2(23), respectively, is equal to or larger than a predetermined value, instead of switching the operating mode of the voltage converter 10 to the parallel operating mode when one of the temperatures TB1 and TB2 of B1(29) and B2(23), respectively, becomes equal to or higher than the upper threshold value A or lower than the lower threshold value B, as illustrated in steps S102, S103 of FIG. 6 of the embodiment described above. Subsequently, as illustrated in steps S104 to S122 of FIG. 6, the input/output power distribution ratio of the high temperature battery (current source battery) is decreased and the input/output power distribution ratio of the normal battery (voltage source battery) is increased to lower the temperature of the high temperature battery. Alternatively, the input/output power distribution ratio of the low temperature battery (current source battery) is increased and the input/output power distribution ratio of the normal battery (voltage source battery) is decreased to raise the temperature of the low temperature battery. As a result, the difference in temperature between the batteries 20, 23 is decreased to avoid restriction of the input/output power of the batteries, while improving the battery life of the batteries 20, 23 by distributing the loads of the batteries. Alternatively, the switching of the operating mode to the parallel operating mode may also be performed, in addition to steps S102, 103 of FIG. 6, when the difference in temperatures TB1 and TB2 of B1(20) and B2(23), respectively, is equal to or larger than the predetermined value.

What is claimed is:

1. An electric vehicle, comprising:
    a first direct current (DC) power supply;
    a second DC power supply;
    a voltage converter configured to perform bidirectional voltage conversion between an output electric path and one or both of the first and second DC power supplies, while allowing switching of an operating mode between a serial operating mode in which the first and second DC power supplies are connected in series relative to the output electric path, and a parallel operating mode in which the first and second DC power supplies are connected in parallel;
    a temperature sensor configured to detect a temperature of each of the DC power supplies; and
    a control unit configured to switch the operating mode of the voltage converter, wherein
    the control unit switches the operating mode of the voltage converter to the parallel operating mode when the temperature of one of the DC power supplies detected by the temperature sensor is equal to or higher than a predetermined upper threshold value or equal to or lower than a predetermined lower threshold value.

2. The electric vehicle according to claim 1, wherein
    when the temperature of one of the DC power supplies becomes equal to or higher than the predetermined upper threshold value, the control unit decreases an input/output power distribution ratio of the one of the DC power supplies and increases the input/output power distribution ratio of the other of the DC power supplies, and
    when the temperature of one of the DC power supplies becomes equal to or lower than the predetermined lower threshold value, the control unit increases the input/output power distribution ratio of the one of the DC power supplies and decreases the input/output power distribution ratio of the other of the DC power supplies.

3. An electric vehicle, comprising:
    a first DC power supply;
    a second DC power supply;
    a voltage converter configured to perform bidirectional voltage conversion between an output electric path and one or both of the first and second DC power supplies, while allowing switching of an operating mode between a serial operating mode in which the first and second DC power supplies are connected in series relative to the output electric path, and a parallel operating mode in which the first and second DC power supplies are connected in parallel;
    a temperature sensor configured to detect a temperature of each of the DC power supplies; and
    a control unit including a central processing unit (CPU) and configured to switch the operating mode of the voltage converter, wherein the control unit causes the CPU to execute an operating mode switching program in which the operating mode of the voltage converter is switched to the parallel operating mode when the temperature of one of the DC power supplies detected by the temperature sensor is equal to or higher than a predetermined upper threshold value, or equal to or lower than a predetermined lower threshold value.

4. A method for controlling an electric vehicle, the electric vehicle including:
- a first DC power supply;
- a second DC power supply;
- a voltage converter configured to perform bidirectional voltage conversion between an output electric path and one or both of the first and second DC power supplies, while allowing switching of an operating mode between a serial operating mode in which the first and second DC power supplies are connected in series relative to the output electric path, and a parallel operating mode in which the first and second DC power supplies are connected in parallel;
- a temperature sensor configured to detect a temperature of each of the DC power supplies; and
- a control unit configured to switch the operating mode of the voltage converter, the method for controlling the electric vehicle comprising switching the operating mode of the voltage converter to the parallel operating mode when the temperature of one of the DC power supplies detected by the temperature sensor becomes equal to or higher than a predetermined upper threshold value, or equal to or lower than a predetermined lower threshold value.

* * * * *